Mar. 6, 1923.

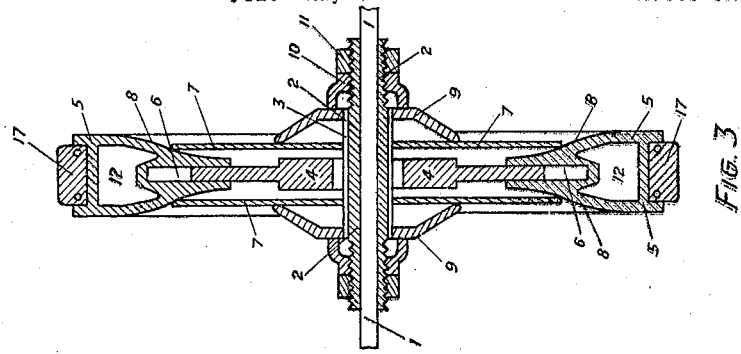
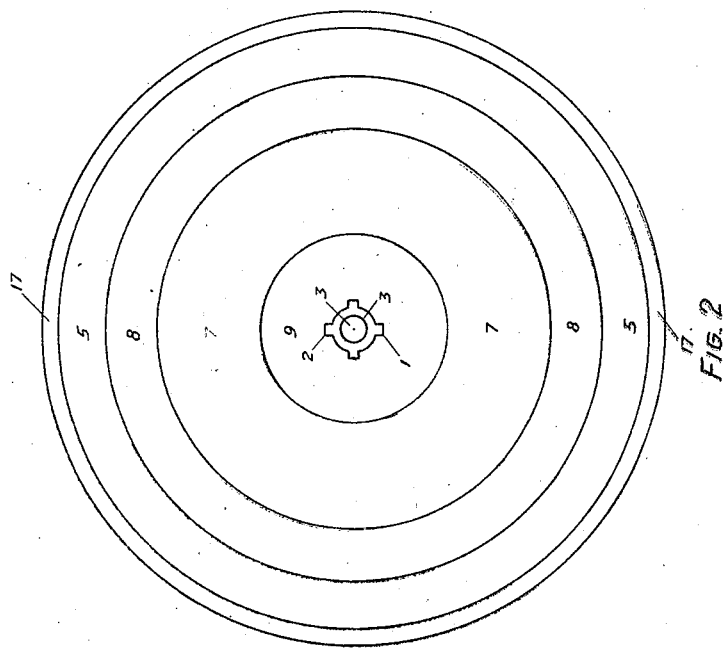
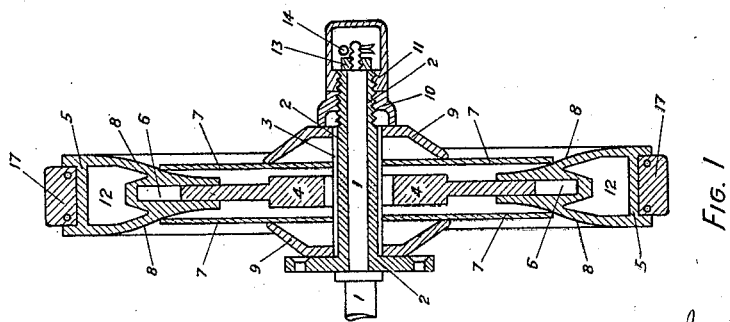

M. J. ARCE 1,447,291

ELASTIC WHEEL

Filed May 3, 1920

Inventor.
Manuel Jose Arce
By B. Singer, Atty

Mar. 6, 1923.

M. J. ARCE

ELASTIC WHEEL

Filed May 3, 1920

Inventor.
Manuel Jose Arce,
By B. Singer
Atty.

Mar. 6, 1923.

M. J. ARCE

ELASTIC WHEEL

Filed May 3, 1920

Inventor.
Manuel Jose Arce,
By B. Singer
Atty.

Mar. 6, 1923.

M. J. ARCE

ELASTIC WHEEL

Filed May 3, 1920

Inventor.
Manuel Jose Arce,
By B. Singer
Atty.

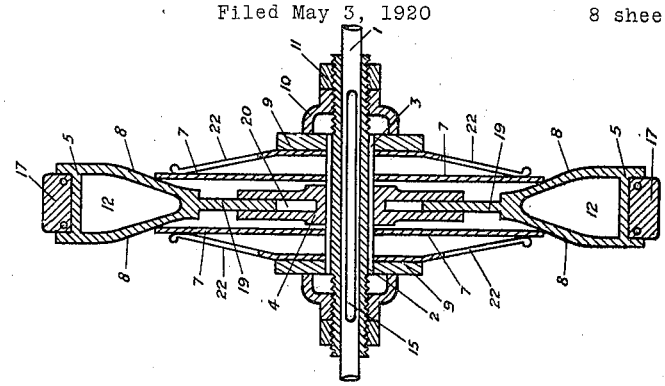
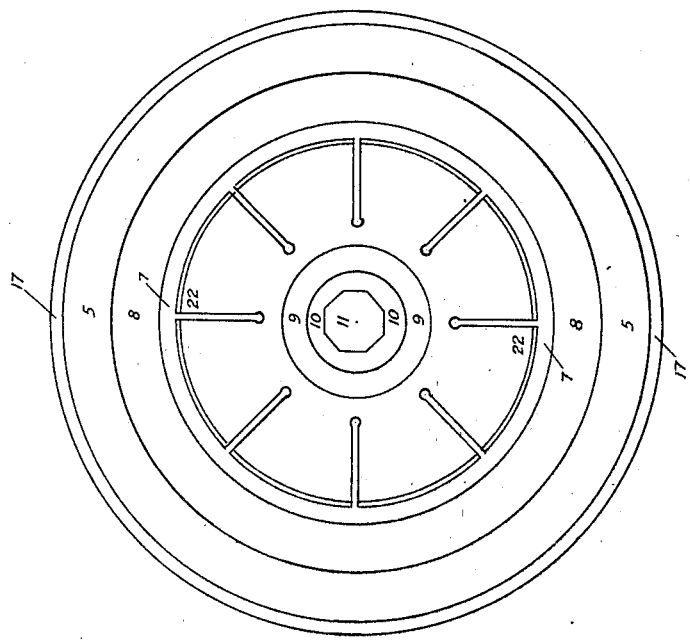
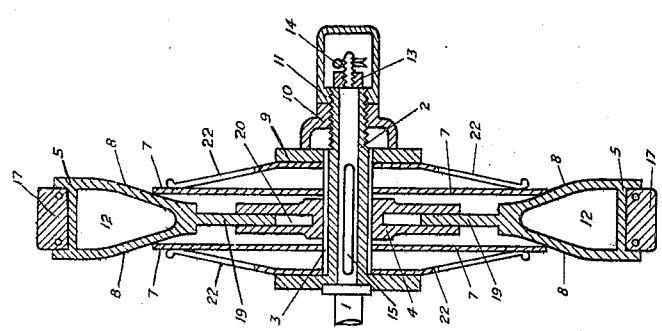

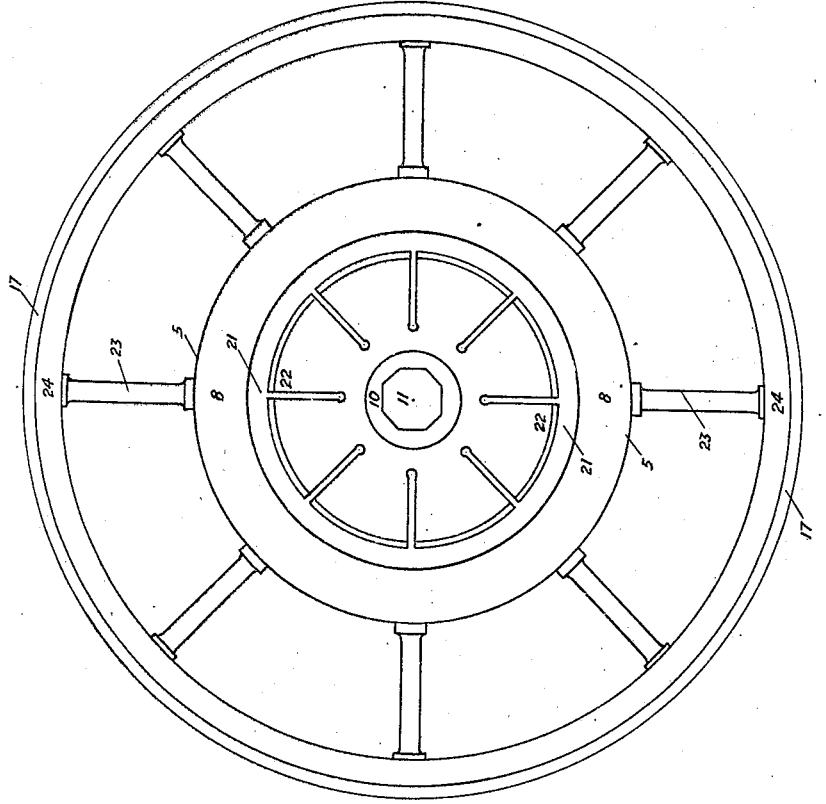
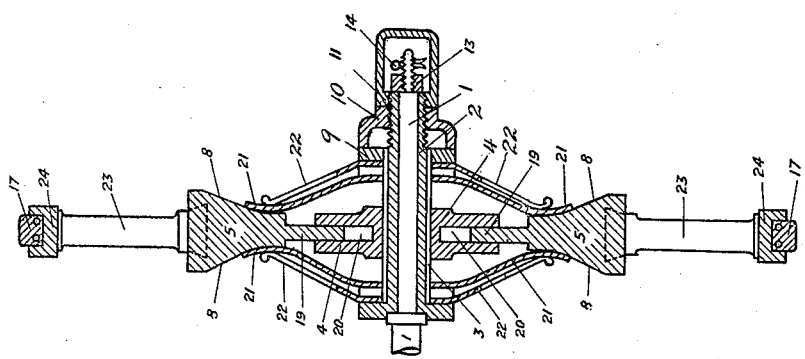

Patented Mar. 6, 1923.

1,447,291

UNITED STATES PATENT OFFICE.

MANUEL JOSE ARCE, OF BUENOS AIRES, ARGENTINA.

ELASTIC WHEEL.

Application filed May 3, 1920. Serial No. 378,609.

*To all whom it may concern:*

Be it known that I, MANUEL JOSE ARCE, citizen of the Argentine Republic, and resident of Buenos Aires, Argentine Republic, have invented certain new and useful Improvements in Elastic Wheels, of which the following is a specification.

This invention relates to a new system of elastic wheels for automobiles, motorcycles, bicycles, railway and Decauville rolling stock, and the like, carts, coaches and all classes of animal or mechanical traction vehicles. The invention comprises two springs mounted on the bushing of the axle of the wheel, each comprising one or more circular leaves or elastic disks arranged symmetrically relative to the plane of the wheel normal to the axle, and concentric with the latter; being subjected to a stress in the direction of the axle, which tends to bring them together exerting a pressure on both faces of a rim, wedge-shaped in its cross-section. In certain cases the rim constitutes the tyre of the wheel, and for this purpose its outer cylindrical surface is covered with a suitable material in order to avoid the trepidation in rolling, in the case of a coach, automobile, etc.; or it may be of a suitable material and shape in the case of railway, Decauville and other rolling stock. In other cases, the rim is interposed between the tyre and the axle, the first two mentioned parts being united by the spokes of the wheel.

Both springs, consisting of the same number of leaves or disks of the same elastic strength, are arranged concentrically on either side of the rim, holding both faces of the same, which, as already stated, are wedge-shaped in cross section relative to a plane normal to that of the wheel, passing through the axle. The pressure exerted by the springs on the faces of the rim is applied in the direction of the axle of the wheel, with the aid of a nut placed on a part concentric with same, which serves as a bushing, and on which are mounted the disks which constitute each spring, so that the disks may slide on it lengthwise of the axle, toward or away from each other, subjecting both faces of the rim to a more or less strong pressure.

The springs can slide lengthwise of the axle, in order to exert pressure on both faces of the rim, but they cannot rotate on the bushing, and to this end the latter is provided with four ribs which engage a similar number of grooves formed in the disks which constitute the springs, and which guide their movement lengthwise of the axle.

When it is of no importance whether a change occurs or not in the position of the plane of symmetry of the wheel normal to the axle, the pressure of the springs is obtained by the aid of a nut placed in the rim and in the outer face of the wheel. This occurs in automobiles, coaches, etc., in which a slight variation of the gauge is not of importance.

On the other hand, when it is not possible to vary the gauge, it being indispensable that the plane of symmetry of the wheel remain unvaried, as occurs in railway, Decauville and similar rolling stock, the pressure is obtained by the aid of two symmetrical nuts mounted on either side of the wheel, at the ends of the bushing. Each nut must be moved forward the same distance in order to exert the same pressure on each spring.

The rim being arranged concentrically with the two springs which exert pressure on its faces, it will be evident that if the wheel, when rolling, meets an obstruction which will produce a dynamic action opposed to that caused by the gravity of the load, the rim will be displaced upwardly and the wedge formed by both faces of same, is introduced between both spring, which will yield to a certain extent, but only to react immediately, expelling the wedge until the rim assumes its original position, once the dynamic effect has disappeared. During the displacement of the rim, and while the action of the wedge and the reaction of the springs is taking place, the axle tends to maintain its position, and the dynamic action produced by the obstruction will be perceptible on the axle in inverse ratio to the sensitiveness of the springs. The rim is united to the axle of the wheel by means of a circular plate mounted on the bushing between the two springs, and which—with its periphery lodged in a groove formed in the inner cylindrical face of the rim, or vice-versa—guides and limits its movement.

The central plate slides with the springs on the bushing, when the gauge is variable; and is fixed to the bushing, as the axle is keyed to the same, when the gauge must be invariable. In this latter case, the plate fixed to the bushing prevents the springs from varying the width of the gauge on exerting pressure on the rim, since the rim being united to the plate by the groove, its lateral displacement can only occur together with the plate.

A convenient way of carrying into practice a system of elastic wheels, according to this invention, will be hereinafter described with reference to the accompanying drawings, in which:—

Fig. 1 represents a section of an automobile wheel with springs consisting of a single disk or flat circular leaf with a single pressure nut on the exterior face, the tyre consisting of the rim proper covered with a band of rubber. The central circular plate which guides the movement of the rim, fits in the groove formed in the inner cylindrical face of the latter.

Fig. 2 is a side view of Figure 1, showing in section the axle and the bushing with the four flanges on which the disks of the springs slide lengthwise of the axle of the wheel.

Fig. 3 is a section of a wheel of a vehicle in which it is necessary to maintain the plane of symmetry normal to the axle, to which end it has two pressure nuts, one on each side, screwed onto both ends of the bushing.

Figure 15:
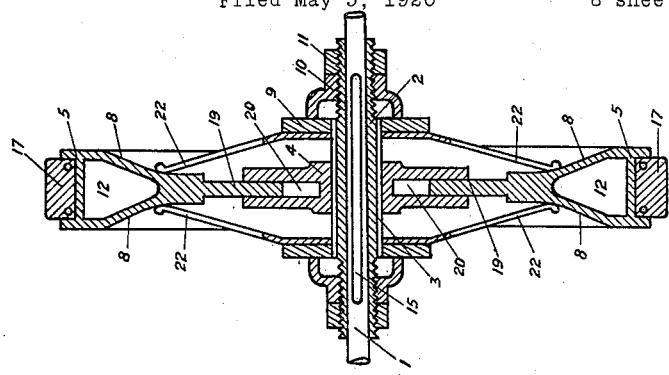
Figure 14:
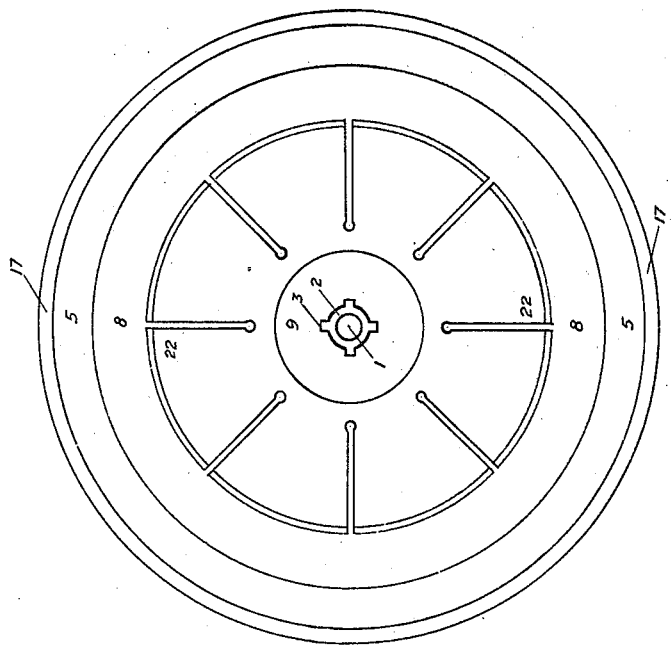
Figure 13:
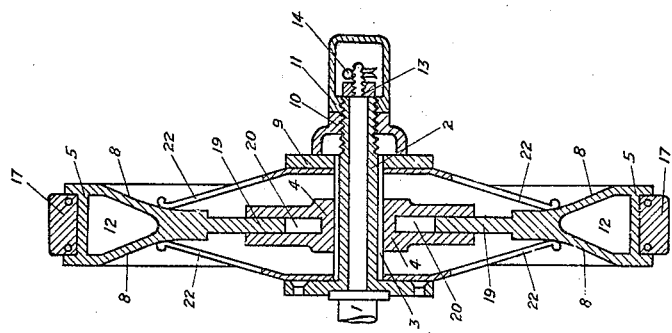

Figures 13, 14 and 15 are views similar to the aforesaid, each spring consisting of a frusto-conical leaf with radial cuts to make it elastic. The rim, in this case, presents on its inner face a circular rib which engages in a groove formed in the central circular plate. In Figure 15 the axle is keyed to the bushing.

Figure 12:
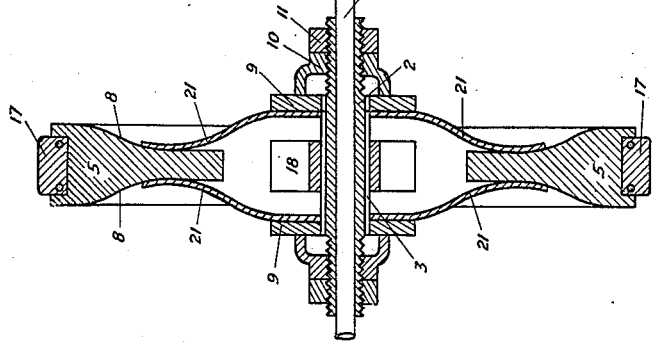
Figs. 10, 11 and 12 illustrate the same sections and views as Figures 1, 2 and 3, but in this case each spring is formed by a circular leaf of frusto-conical surface in its central part and flat at the periphery; the rim is free and its displacements are subject to the action of the springs; it being solid in cross-section and not hollow as in the former figures.
Figure 11:
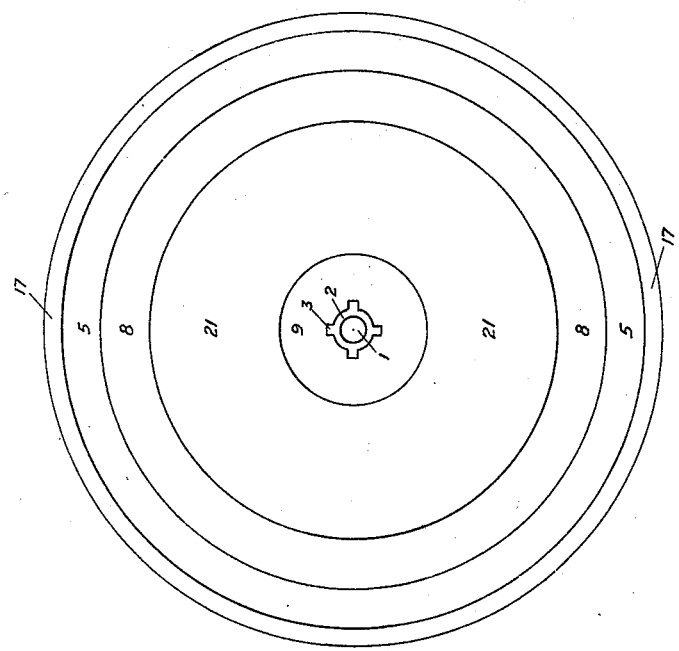
Figure 10:
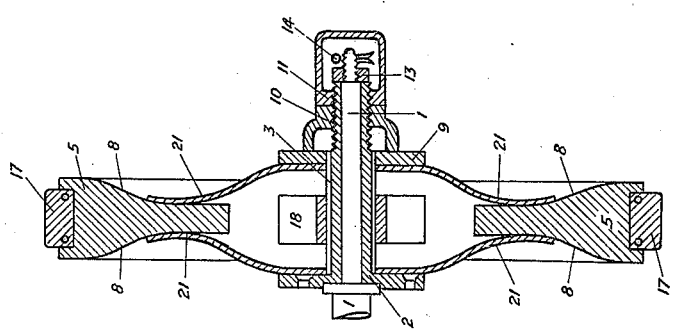
Figure 18:
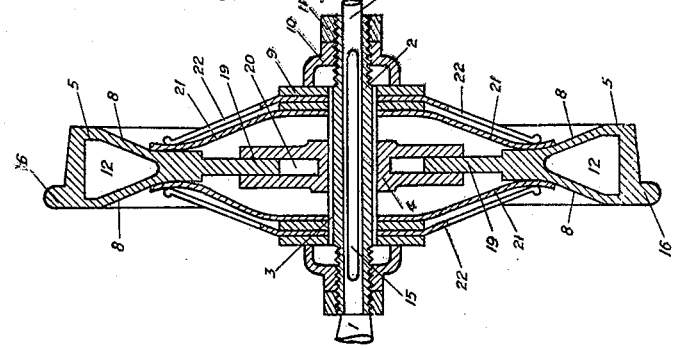
Figure 17:
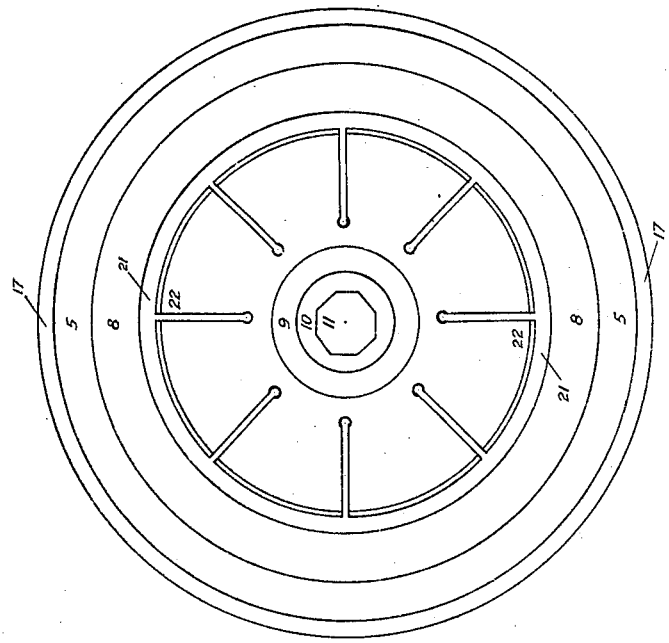
Figure 16:
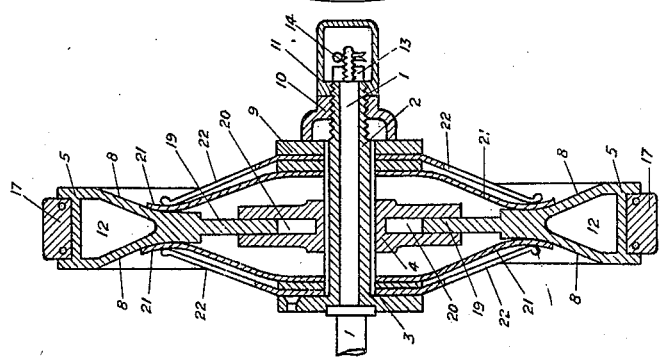

Figs. 16, 17 and 18 show the same sections and views as in the preceding figures, the springs in this case consisting of the combination of a circular elastic leaf of frusto-conical surface in its centre and flat at its periphery, as shown in Figures 10, 11 and 12, and another one also circular and frusto-conical with radial cuts to give it elasticity, as shown in Figs. 13, 14 and 15. In Fig. 18 the axle is keyed to the bushing, and the rim, which is hollow, has the same section as the tyre of a railway, Decauville or similar wheel, with its corresponding flange.

Figures 19, 20 and 21 are views similar to those of Figs. 13, 14 and 15, the springs being formed of one circular flat elastic leaf and another frusto-conical with radial cuts. The axle is keyed to the bushing as shown in Figs. 19 and 21.

Figs. 22 and 23 are a section of a coach, cart or other wheel, of large diameter, and a side view of the same. The rim acted upon by the springs is connected to the tyre by the spokes of the wheel.

In the different figures of the accompanying drawings, 1 indicates the axle of the wheel, which enters the bushing 2, provided on the outside with ribs 3. Mounted on the bushing are: in the centre, the circular plate 4 which guides the displacement of the rim 5, engaging in the groove 6: at either side of the plate 4, the springs consisting of disks or flat circular elastic leaves 7 which, with the portions placed further away from the centre, hold the faces 8 of the rim 5; at either side of the springs, the circular rigid frusto-conical pieces 9 which transmit to the springs the pressure of nuts 10 and locking nuts 11, screwed on to the bushing 2.

Figure 6:
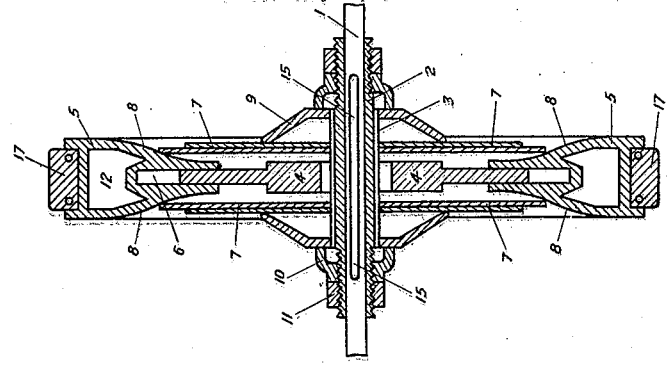
Figs. 4, 5 and 6 are views similar to the three preceding ones, respectively, with the difference that in this case each spring consists of two disks or flat circular leaves; the axle is keyed on to the bushing as shown in Figs. 7 and 9, and in the latter the rim which serves as a tyre has the shape of the wheels of railway, Decauville and other similar rolling stock.
Figure 5:
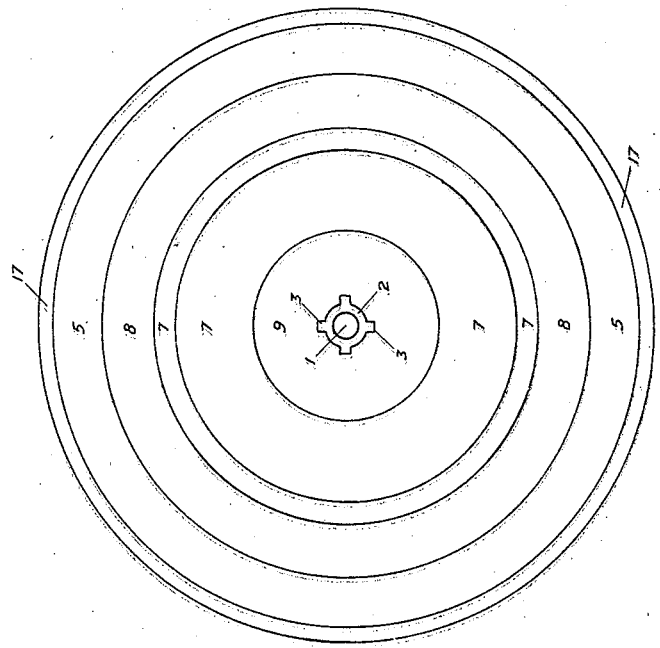
Figure 4:
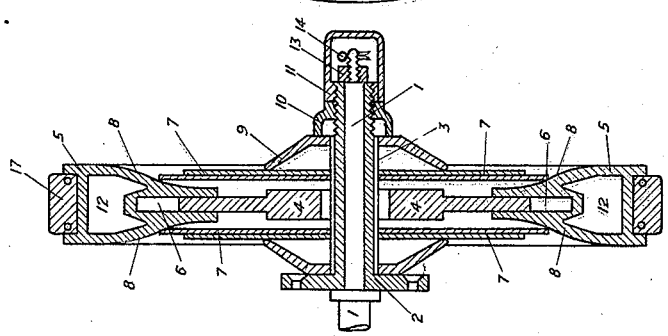
Figure 9:
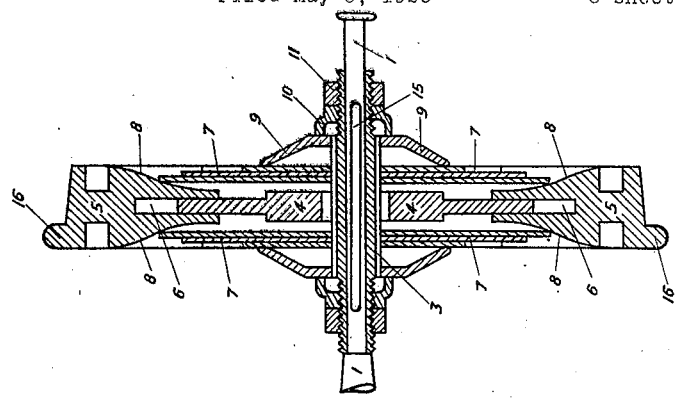
Figure 8:
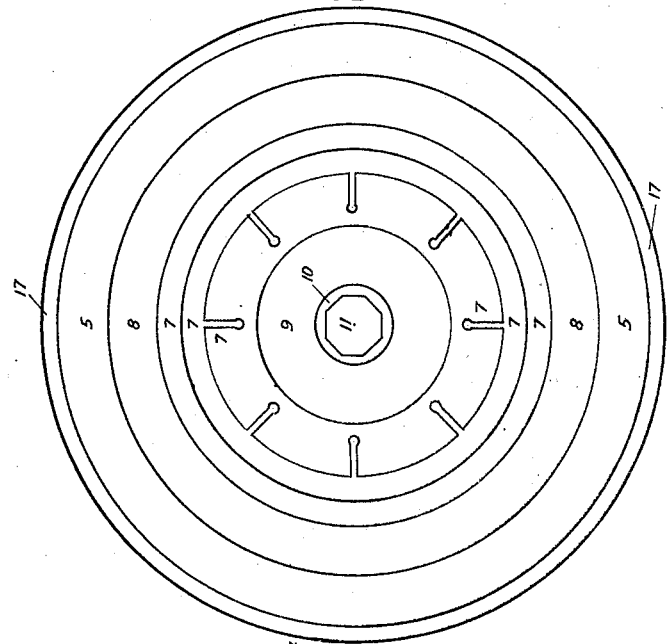
Figure 7:
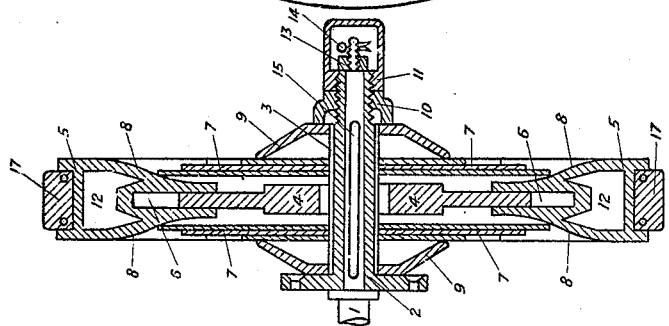

The rim 5, in some cases, is solid as in Figures 10, 11 and 12, and in other cases its central portion 12 is hollow. In Figures 1, 4, 7, 10, 13, 16, 19 and 22 the axle is fixed to the bushing by the threaded washer 13 and cotter pin 14, and when the wheel is a traction wheel, the joint is secured by means of key 15. In Figures 9 and 18 the rim 5 has the form of the tyres of railway, Decauville and other similar wheels, with the corresponding flange 16. In the remaining figures it has a rubber band 17. In Figures 10, 11 and 12 the rim is free, and its displacement is radially limited by the pulley 18.

In Figs. 13 to 23 the rim 5 has on its inner circular face a circular rib 19 which engages in the groove 20 formed in the central circular plate 4.

In Figs. 10, 11 and 12 the springs are formed by circular elastic leaves 21 frusto-conical in the centre and flat at the periphery.

In Figs. 13, 14 and 15 the springs are formed by elastic frusto-conical leaves 22 with radial cuts to give them elasticity.

In Figs. 16, 17, 18, 22 and 23 the springs are formed by the combination of leaves 21 and 22.

In Figs. 19, 20 and 21 the springs are formed by the combination of leaves 7 and 22.

In Figs. 10 to 23 the parts 9 which transmit the pressure of nuts 10 and lock-nuts 11 to the springs, are circular and flat.

In Figs. 22 and 23, the rim 5 is united, by the spokes 23, to the tyre 24 of the wheel, and the latter has a rubber band 17.

Once the different parts have been conveniently prepared, axle 1 is introduced into the bushing 2, securing same with the ring 13 and cotter pin 14; on the bushing one of the frusto-conical pieces 9 is mounted, sliding it over the ribs 3 until meeting one of the flanges of the bushing, or the nut 10 of one end; then a spring consisting of one or more flat circular elastic leaves 7 or a combination of these with the elastic leaves 21 or 22, is mounted; immediately after, the central circular plate 4 mounted in the rim 5 is introduced and slided along the bushing until face 8 contacts with the spring already placed; then the other spring is mounted, consisting of the same number and class of elastic leaves as the former, and symmetrically arranged, bringing it nearer until it contacts with the other face 8 of the rim 5; then the other rigid frusto-conical piece is introduced making it bear against the latter spring; nut 10 is then screwed on and secured by lock-nut 11 which covers ring 13 and cotter pin 14.

The pressure to be exerted by the nut on the springs, must be limited to counter-balance the action of the weight of the vehicle, which tends to introduce between them the wedge of the rim in all its extension, in such a way that there will be an ample margin to allow for the movement or play of the wedge within the springs, in order to absorb the dynamic effect set up when the wheel passes over any obstacle whatsoever.

Once assembled in the manner described, the wheel will be ready for service.

Having thus described my invention, what I claim is:—

1. An elastic wheel comprising in combination, an axle and a bushing thereon with four flanges on the outer surface, and mounted loosely upon the latter, two springs, each composed of elastic disks having radial cuts to give them greater elasticity; and between both springs mounted on the said axle, a circular plate the periphery of which engages and slides in a plane normal to the axle, within a groove furnished in the cylindrical interior part of a crown having a wedge-form section, held between both springs, which exercise a uniform pressure on the lateral faces which form a wedge, submitted to a strain in the direction of an axis by the help of nuts and locknuts screwed upon the bushing, returning the crown to a concentric position in relation to the former, if on passing over an obstacle of any kind it should be momentarily decentralized by the dynamic strain developed, introducing the wedge between both springs.

2. In a vehicle wheel, a circular plate, a rim having an annular groove on its inner side in which said plate is mounted for eccentric movement, said rim also having inclined inwardly converging faces, a bushing to receive an axle, said bushing extending through a central opening with which the circular plate is provided, spring discs bearing at their peripheries against the inclined faces of the rim and having central openings through which the bushing extends, pressure transmitting member movable on the bushing and bearing against the outer sides of the spring discs, and means also on the bushing to apply pressure to the pressure transmitting members.

Signed at Buenos Aires, Argentine Republic, this 26th day of March A. D. 1920.

MANUEL JOSE ARCE.

Witnesses:
A. UROMAL,
J. H. MAHER.